United States Patent
Cicchetti et al.

(10) Patent No.: US 7,809,476 B2
(45) Date of Patent: *Oct. 5, 2010

(54) NETWORK TAP/AGGREGATOR CONFIGURED FOR POWER OVER ETHERNET OPERATION

(76) Inventors: Christopher J. Cicchetti, 2147 Avy Ave., Menlo Park, CA (US) 94025; Arthur M. Lawson, 1385 James Ct., Morgan Hill, CA (US) 95037; Greta L. Light, 214 42nd Ave., San Mateo, CA (US) 94403; Paul Gentieu, 395 E. Evelyn Ave., #236, Sunnyvale, CA (US) 94086; Timothy M. Beyers, 1025 Hampshire St., Apt. B, San Francisco, CA (US) 94110; Donald A. Blackwell, 19534 Vineyard La., Saratoga, CA (US) 95070-4556

( * ) Notice: Subject to any disclaimer, the term of this patent is extended or adjusted under 35 U.S.C. 154(b) by 652 days.

This patent is subject to a terminal disclaimer.

(21) Appl. No.: 11/421,372

(22) Filed: May 31, 2006

(65) Prior Publication Data

US 2007/0081549 A1 Apr. 12, 2007

Related U.S. Application Data

(60) Provisional application No. 60/735,262, filed on Nov. 11, 2005, provisional application No. 60/726,120, filed on Oct. 12, 2005.

(51) Int. Cl.
*G05D 7/03* (2006.01)
*H04L 12/66* (2006.01)

(52) U.S. Cl. ......................... 700/286; 713/300

(58) Field of Classification Search ............... 370/241, 370/241.1, 247, 252, 254, 463; 700/286, 700/295, 297; 713/300
See application file for complete search history.

(56) References Cited

U.S. PATENT DOCUMENTS 6,785,908 B1  8/2004  Kamaya (Continued)

FOREIGN PATENT DOCUMENTS

WO   2007/059509 A2   5/2007

OTHER PUBLICATIONS

U.S. Appl. No. 11/421,361, filed May 31, 2006, Christopher J. Cicchetti, et al.

(Continued)

*Primary Examiner*—Seema S Rao
*Assistant Examiner*—Mon Cheri S Davenport (57) ABSTRACT

A network tap device array capable of being powered by a power-over Ethernet ("POE") supply is disclosed. The array enables data from multiple nodes in a communications network to be tapped and forwarded to a plurality of monitoring devices. In one embodiment the network tap device array includes a chassis that is configured to receive a plurality of network tap devices that are each powered by a POE supply. Each network tap device includes network ports for receiving and transmitting network data via communication cables and tap ports for forwarding the tapped network data to the monitoring device. In another embodiment, a sub-chassis includes a plurality of network tap devices and an aggregator that aggregates tapped data from each of the tap devices. The aggregator then forwards the aggregated data to the monitoring device. The sub-chassis can be included in a chassis that is configured to receive multiple populated chassis.

25 Claims, 6 Drawing Sheets

U.S. PATENT DOCUMENTS

| | | | |
|---|---|---|---|
| 6,816,590 B2 | 11/2004 | Pike et al. | |
| 6,868,069 B2 | 3/2005 | Knobbe et al. | |
| 7,373,528 B2 * | 5/2008 | Schindler | 713/300 |
| 7,548,515 B2 | 6/2009 | Walsh | |
| 7,561,517 B2 | 7/2009 | Klinker et al. | |
| 2003/0072438 A1 | 4/2003 | Le Creff et al. | |
| 2004/0120259 A1 * | 6/2004 | Jones et al. | 370/250 |
| 2004/0215832 A1 | 10/2004 | Gordy et al. | |
| 2004/0228090 A1 * | 11/2004 | Blackwell | 361/695 |
| 2005/0041684 A1 * | 2/2005 | Reynolds et al. | 370/463 |
| 2005/0071711 A1 | 3/2005 | Shaw | |
| 2005/0129033 A1 | 6/2005 | Gordy et al. | |
| 2005/0147082 A1 | 7/2005 | Keddy et al. | |
| 2005/0222815 A1 | 10/2005 | Tolly | |
| 2005/0257262 A1 * | 11/2005 | Matityahu et al. | 726/22 |
| 2005/0281326 A1 * | 12/2005 | Yu | 375/222 |
| 2006/0063509 A1 * | 3/2006 | Pincu et al. | 455/402 |
| 2006/0153092 A1 | 7/2006 | Matityahu et al. | |
| 2006/0233115 A1 * | 10/2006 | Matityahu et al. | 370/252 |
| 2007/0081553 A1 * | 4/2007 | Cicchetti et al. | 370/466 |
| 2007/0171966 A1 | 7/2007 | Light et al. | |
| 2007/0174492 A1 | 7/2007 | Light et al. | |
| 2007/0253349 A1 | 11/2007 | Light et al. | |
| 2008/0013467 A1 | 1/2008 | Light et al. | |
| 2008/0014879 A1 | 1/2008 | Light et al. | |

OTHER PUBLICATIONS

Texas Instruments, "Integrated 100-V IEEE 802.3af PD and DC/DC Controller," SLV5590A, Aug. 2005, 38 pages.
Texas Instruments, "10-W Power-Over-Ethernet Isolated Power Module Assembly," SLT5224B, Jul. 2004, 11 pages.
U.S. Appl. No. 11/421,361, Mail Date Feb. 17, 2009, Office Action.
U.S. Appl. No. 11/560,341, Mail Date Aug. 20, 2009, Office Action.
U.S. Appl. No. 11/776,286, Mail Date Oct. 1, 2009, Office Action.
U.S. Appl. No. 11/421,361, Mail Date Nov. 24, 2009, Final Office Action.
U.S. Appl. No. 11/421,361, Mail Date Feb. 2, 2010, Office Action.
U.S. Appl. No. 11/776,286, Mail Date Feb. 17, 2010, Notice of Allowance.

* cited by examiner

NETWORK TAP/AGGREGATOR CONFIGURED FOR POWER OVER ETHERNET OPERATION

CROSS-REFERENCE TO RELATED APPLICATIONS

This application claims the benefit of U.S. Provisional Patent Application No. 60/735,262, filed Nov. 11, 2005, and entitled "NETWORK TAP/AGGREGATOR CONFIGURED FOR POWER OVER ETHERNET OPERATION;" and U.S. Provisional Patent Application No. 60/726,120, filed Oct. 12, 2005, and entitled "NETWORK TAP CONFIGURED FOR POWER OVER ETHERNET OPERATION," both of which are incorporated herein by reference in their entireties.

BACKGROUND

1. Technology Field

The present invention generally relates to network tapping devices. In particular, the present invention relates to a network tap/aggregator and associated devices, hardware and software, that are configured for Power Over Ethernet ("POE") based operation.

2. The Related Technology

The dependence upon the use of data networks to transmit and receive data at high data rates has led to a corresponding interest in the ability to perform real-time monitoring and analysis of that data, or network traffic, so that performance of the network can be evaluated, and problems identified and resolved. Such data monitoring and analysis necessitates the ability to access the network data stream without disrupting data transmission and the operation of the network.

To this end, hardware devices known as "network taps" are employed and configured such that network data can be captured for analysis without interrupting operation of the network. In general, network taps receive a stream of network data and make a copy of the data while allowing the original stream to pass through to its destination. The copied data is forwarded to a network analyzer or other monitoring device for evaluation. This is typically a real time process that continually occurs while the network tap is operating.

While network taps have generally proven useful in enabling the monitoring and analysis of network traffic, significant problems remain with typical network taps. One problem of particular concern is that network taps typically require an external power source for operation. Because the network tap relies on an external power source, an interruption of power to the network tap generally results in a corresponding interruption in data flow through the network. Even a very short term interruption in power to the network tap will force a typical data network as a whole to re-initialize, often using complex auto-negotiation and discovery algorithms. This initialization process can take from a few seconds to several minutes, depending on the network topology. As a result, an interruption of power to the network tap can severely impair operation of the entire data network.

Thus, the external power supply to the network tap is a significant failure point in the system. Unfortunately, disconnection of such external power supplies is a relatively common occurrence. In many cases, disconnection of the external power supply to the network tap occurs because the network tap and power supply are located in a place where personnel may inadvertently, or mistakenly, unplug the power supply. These challenges are only magnified where multiple network taps are implemented in the communication network or other system. As noted above, this lack of fault tolerance in many high speed data communication networks is a major concern that remains largely unaddressed.

Other problems concern aggregation devices that are often employed in conjunction with network TAPs. For example, typical aggregation devices incorporate a single port configuration. Thus, a user that desires to aggregate multiple data streams is compelled to use a relatively large number of aggregators, and a significant amount of cabling, in order to obtain the desired aggregation results.

BRIEF SUMMARY

The present invention has been developed in response to the above and other needs in the art. Briefly summarized, embodiments of the present invention are directed to a network tap device array capable of being powered by a power-over Ethernet ("POE") supply. The array is employed in enabling data from multiple nodes in a communications network to be tapped and forwarded to a plurality of monitoring devices.

In one embodiment the network tap device array includes a plurality of network tap devices that are each powered by a POE supply. Powering of each network tap device in the array with a POE supply eliminates a potential network stream data failure point, such as when a traditional external power supply (e.g., converted AC power supply from a wall outlet) is used to power each tap. Interruption of this traditional external power supply during tap operation can interrupt the data stream passing through the tap, which as described above, can significantly impair operation of the network. Further, elimination of the power cord used to provide the traditional power supply to the network tap precludes the possibility of the power supply being interrupted as a result of a person tripping over the cord and unplugging the unit from the power outlet or from failure of the external power supply. Elimination of this failure point in turn contributes to a relative improvement in the reliability and operation of the network.

The network tap device array enables data from multiple nodes in a communications network to be tapped and forwarded to a plurality of monitoring devices. In one embodiment the network tap device array includes a chassis that is configured to receive a plurality of network tap devices, or POE taps, that are each powered by a POE supply. Each POE tap includes network ports for receiving and transmitting network data via communication cables and tap ports for forwarding the tapped network data to a monitoring device. The chassis can be configured to accommodate any number of POE taps, such as 24, for instance.

In another embodiment, a sub-chassis includes a plurality of network tap devices in the form of tap data cards. An aggregator card is also included in the sub-chassis. Each tap data card of the sub-chassis forwards a tapped data stream to the aggregator card. The aggregator card aggregates the data, then forwards the aggregated data to the monitoring device. The sub-chassis can be included in a larger chassis that is configured to receive multiple populated chassis, thereby offering the convenience of scale to tapping systems.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-6 depict various features of embodiments of the present invention, which is generally directed to multi-port network tap/aggregators, taps, and associated devices, hardware and software, that are configured for Power Over Ethernet ("POE") based operation in connection with copper-based Ethernet networks.

It should be noted that the disclosure concerning POE network tap systems, software, and devices that is included in commonly owned United States patent application entitled "Network Tap Device Powered by Power Over Ethernet," filed concurrently herewith and incorporated herein in its entirety by this reference, is generally germane as well to the multi-port network tap/aggregator and other POE devices disclosed herein. Note also that both "tap" and "TAP" are shorthand notations for "test access point" and those notations are used interchangeably herein.

Among other things, examples of a POE network tap array ("POE tap array") and a POE network tap/aggregator ("POE T/A") obviate the need for the use of traditional external network tap power supplies, such as power supplied by traditional wall outlets, and thereby eliminate potential failure points from the network. Elimination of these failure points, in turn, contributes to a relative improvement in the reliability and operation of the network. Moreover, it is a consequence of employment of embodiments of the POE tap array and POE T/A that, because the TAP portion of these arrangements obtains its power from the network, the TAP fails only as a result of network failure. This is in contrast with the use of more conventional network taps, where the network can fail as a result of disconnection or failure of the traditional external power supply of the tap. Additionally, the multiport configuration of example embodiments of the POE T/A arrangement enable relatively less complex installations while providing a high level of flexibility for the system by enabling aggregation of multiple data streams.

I. Example Configurations and Form Factors

Embodiments of the POE tap array, POE T/A, and other POE devices disclosed herein can be implemented in a variety of configurations and form factors. Accordingly, the scope of the invention is not intended to be limited to the example configurations and form factors disclosed herein.

As the foregoing suggests, power for operation of at least portions of the POE tap array and POE T/A is provided by the Ethernet data and power network with which the tap is connected. In one implementation, these devices are configured for use with a copper Ethernet network operating at one or more of a variety of Ethernet data rates, including, but not limited to, 10/100/1000 Mbit/sec., or even higher rates. More generally however, embodiments of the invention are suited for operation with any network where both power and data are carried over the network lines. Accordingly, the scope of the invention should not be construed to be limited to any specific network type or data rate.

Figure 1:
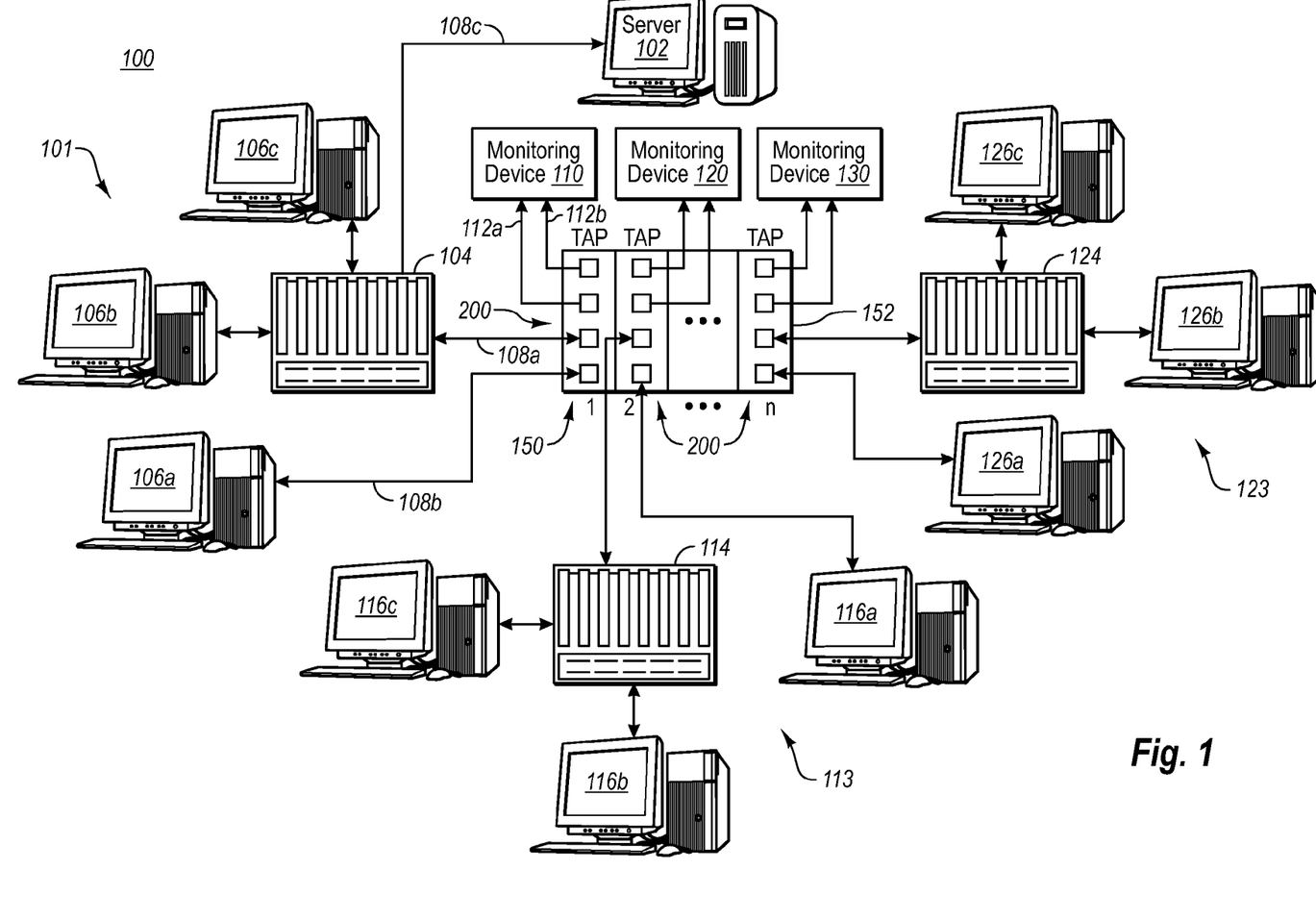
FIG. 1 is a simplified view of an exemplary environment in which embodiments of the present invention can be practiced.

Reference is first made to FIG. 1, which depicts one example of an operating environment in which the POE tap array can be utilized, in accordance with one exemplary embodiment of the present invention. Alternatively, the environment depicted in FIG. 1 can also represent an environment in which the POE T/A of embodiments of the present invention can be included, as discussed further below in connection with FIGS. 6 and 7.

In particular, FIG. 1 shows a block diagram of a communications network, or computer network 100, including a POE network tap array ("POE tap array"), generally designated at 150, in accordance with one embodiment of the present invention. Although computer network 100 was selected to illustrate the present invention, any computer network topology can be used with the present invention, including but not limited to various combinations of network servers, switches, routers, hubs and various end user computers/terminals. Indeed, various modifications to both the POE tap array and its operating environment can be realized while still residing within the scope of the present claimed invention. Hereinafter, individual elements forming a group of like elements may also be referred to by a letter designation.

In greater detail, the computer network 100, in a selected network segment 101, generally includes a network server 102, a network switch 104 (e.g., a router), desktop computers 106*a-c*, and the POE tap array 150. The POE tap array 150 includes a chassis 152 that contains a plurality n of POE tap devices 200 that are each configured to be operated by a power-over-Ethernet power supply ("POE supply") that is provided to the tap by another network component, in this case the switch 104, via a communication cable 108*a*. The discussion to follow regarding details of the POE tap device 200 correspondingly apply to the other n POE tap devices included in the POE tap array 150 as well.

The network server 102, the desktop computers 106*b,c* and the POE tap 200 are coupled directly to the network switch 104. The POE tap 200 is coupled between the network switch 104 and the desktop computer 106*a* via cables 108*a, b*. The POE tap 200 is further coupled to a monitoring device 110 via cables 112*a,b*. For Gigabit Ethernet, the cables 108 and 112 are typically four-pair CAT 5 twisted-pair cables, but the POE tap 200 can also work with 10BASE-T and 100BASE-T Ethernet systems, which typically use Category 3 (CAT 3) cables, or with other suitable transmission lines. The POE tap 200 can be programmed to operate with multiple Ethernet speeds and cables using an onboard microprocessor, discussed further below, or by setting jumpers and/or switches in the POE tap. Similarly, the other n POE tap devices 200 are operably coupled to corresponding monitoring devices, such as the monitoring devices 120 and 130 shown in FIG. 1, and their operation with regard to their respective monitoring devices is as described below with respect to the POE tap 200 and monitoring device 110. In one embodiment each POE tap device is coupled to only one monitoring device; in other embodiments, one monitoring device is coupled to more than one POE tap device. The term "monitoring device" as used herein is understood to include a network analyzer or other diagnostic equipment, intrusion detection system, or any other device used to monitor and/or analyze the operational status of a computer network segment.

In a typical network session, the desktop computer 106a requests from the network server 102 a file containing information needed by an application program executing on the desktop computer 106a. The desktop computer 106a issues a request to the network server 102, which propagates through the POE tap 200 to the network switch 104 via cables 108a, b. The network switch 104 reviews the destination address of the request and routes it to the network server 102 via cable 108c. The network server 102 responds with the requested data. The requested data is sent from the network server 102 to the network switch 104 via cable 108c. The network switch 104 routes the data to the desktop computer 106a via the POE tap 200 and cables 108a, b.

To view the request made by the desktop computer 106a and response made by the network server 102, the POE tap 200 is physically connected between the network switch 104 and desktop computer 106a. Full-duplex data flows simultaneously in both directions over the cables 108. In the present embodiment, the POE tap 200 provides an independent copy, via the cables 112 a, b, of the data flowing in either direction to the monitoring device 110. For example, a request from the desktop computer 106a travels through the network switch 104 to network server 102, and is tapped and sent out a tap port of the POE tap 200 over cable 112a to the monitoring device 110. Likewise, data returning from the network server 102 is tapped and sent out another monitoring port of the POE tap 200 over cable 112b to the monitoring device 110.

For purposes of discussion, selected exemplary components of the computer network 100 as included in the network segment 101 were discussed above. The computer network 100 can be thought of as having a plurality of such segments, such as network segments 113 and 123 shown in FIG. 1. In more detail, the network segment 113 includes a switch 114 and computers 116a-c. The switch 114 is operably connected to a respective one of the n POE taps 200, which in turn is operably connected to the monitoring device 120. Similarly, the network segment 123 includes a switch 124 and computers 126a-c. The switch 124 is operably connected to a respective one of the n POE taps 200, which in turn is operably connected to the monitoring device 130. The operation of the POE taps 200 of the POE tap array 150 that are associated with the network segments 113 and 123 are the same as that described for the POE tap of the network segment 101. Furthermore, note that the network segments described above are defined only for purposes of discussion and are merely representative of one of a variety of possible network and component configurations with respect to the POE tap array 150. Note also that, for purposes of clarity, not all operable connections between the various network components are shown or explicitly identified.

Figure 2:
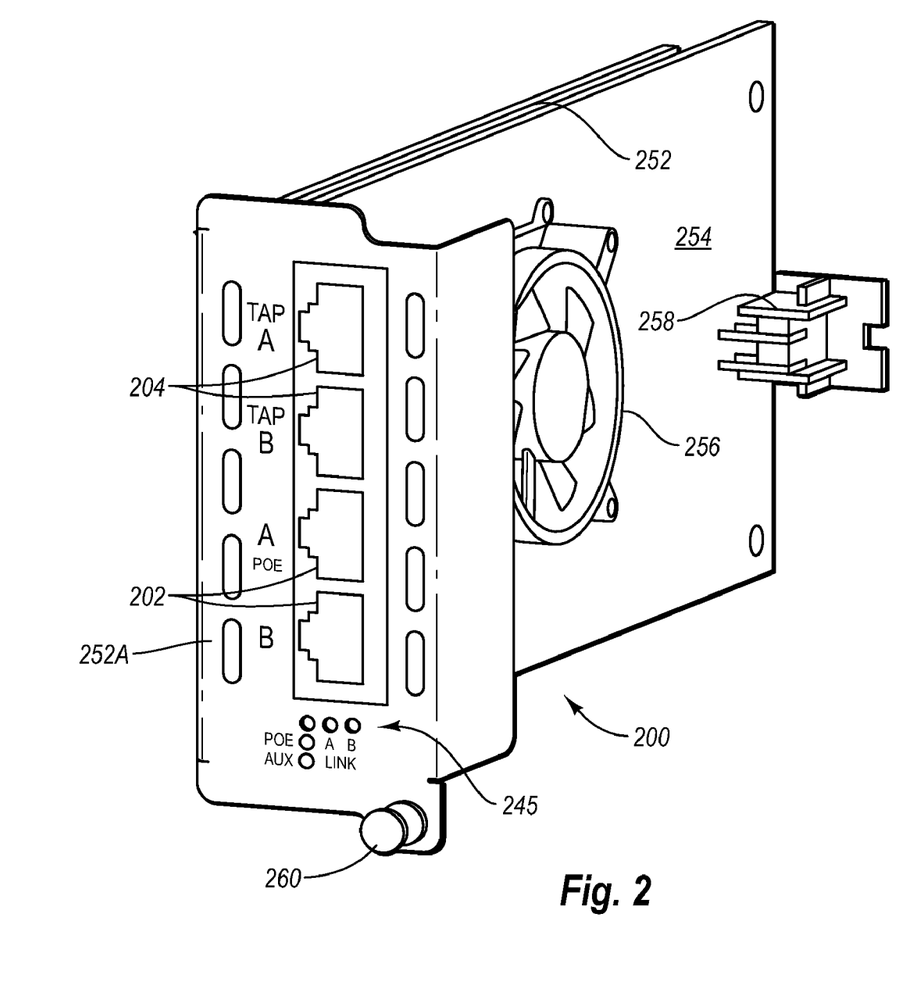
FIG. 2 is a perspective view of a network tap powered by the power-over-Ethernet standard, according to one example embodiment.

Together with FIG. 1, reference is now made to FIG. 2, which depicts a network tap device in the form of one POE tap 200, in accordance with one embodiment. The POE tap 200 shown in FIG. 2 is also referred to herein as a 1×10 POE tap and corresponds to any one of the POE taps grouped together in the chassis 152 of the POE tap array 150 depicted in FIG. 1 and discussed above. As such, the collection of n POE taps 200 in the POE tap array 150 can be employed to provide a non-aggregated Tapping function with respect to multiple data streams that are transmitted through the POE tap array 150 during operation.

In general, the POE tap 200 is a plug-in type card that can be readily inserted into and removed from a chassis, such as the chassis 152 of FIG. 1. This card configuration is sometimes referred to as implementing a "blade" form factor. In one example implementation, the blade form factor for the 1×10 POE TAP card is about 3.5 inches wide by about 1.4 inches high by about 5.5 inches deep. However, the scope of the invention is not limited to those exemplary dimensions.

Figure 3:
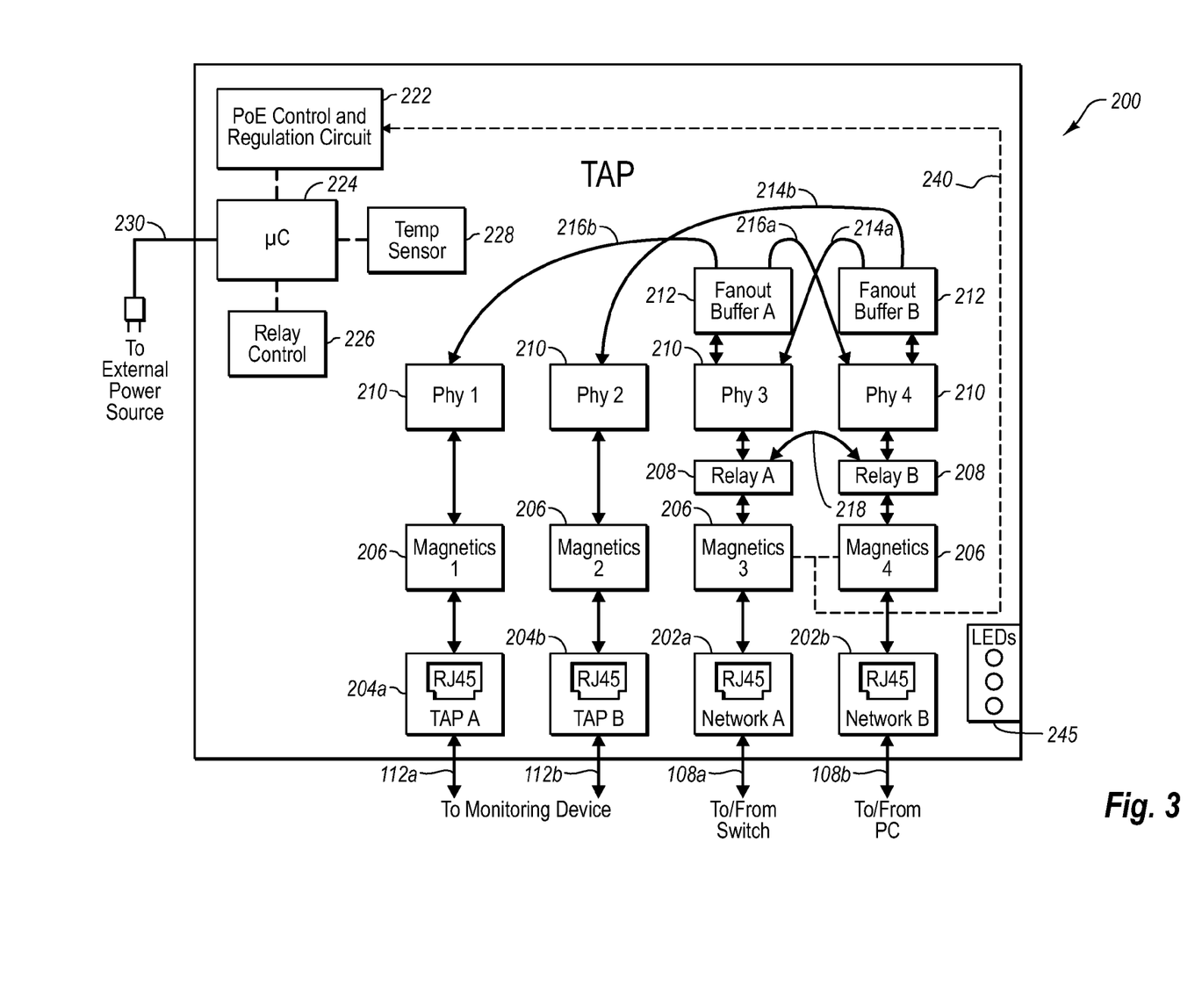
FIG. 3 is a simplified block diagram of the network tap shown in FIG. 2, according to one example embodiment.

In greater detail, the POE tap 200 includes a housing 252 having a front face 252A. A plurality of ports 202 and 204, to be described further below, are included on the front face 252A for enabling connection of communication cables, such as the cables 108 and 112 shown in FIG. 1, with the POE tap. A board 254 is also included with the POE tap 200 on which a plurality of electronic components, some of which will be described below in connection with FIG. 3, are located. A fan 256 is included on the board so as to provide cooling as needed to the electronic board components. A power supply connector 258 is also included adjacent the rear portion of the POE tap 200. In addition, a mounting component, such as a mounting screw 260, is included on the front face 252A to assist in coupling the POE tap 200 to the chassis 152.

Reference is now made to FIG. 3 in describing various internal and other features of the POE tap 200 of FIG. 2 in greater detail. Specifically, the POE tap 200 includes various ports for receiving and transmitting data to and from network components, as depicted in FIG. 1. Two network ports 202a and 202b, also referred to herein as "network A" and "network B" ports, are configured to couple with cables 108a and 108b of the network 100 of FIG. 1, thereby interlinking the POE tap 200 with the network. Similarly, two tap ports 204a and 204b, also referred to herein as "tap A" and "tap B" ports, are configured to couple with cables 112a and 112b (FIG. 1), thereby linking the POE tap 200 to the monitoring device 110. Each of the ports 202 and 204 is configured to receive an RJ-45 plug of the respective cable 108 or 112, typical of Ethernet-based networks, though other port/plug configurations could be alternatively used. Thus, in the case of cat-5 cables 108a and 108b, four twisted pairs of each cable create eight total conductors that interconnect with terminals in the network ports A and B, thereby electrically connecting each cable with the POE tap 200. As explained herein, the ports 202, 204 enable both data signals and POE signals to enter and depart the POE tap 200, as will be described further below.

A series of magnetics modules 206, also referred to herein as "magnetics 1," "magnetics 2," "magnetics 3," and "magnetics 4," are operably connected to a respective one of the ports 202, 204, one magnetics for each port. Each of the magnetics 206 performs signal isolation functions for the respective data signal passing through the magnetics during tap operation.

Two mechanical relays 208, individually referred to herein as "relay A" and "relay B," are operably connected to the magnetics 3 and 4 of the magnetics 206. The relays 208 are employed to selectively divert data signals passing through the POE tap 200 according to operating status of the tap. For instance, when the tap is operating, the relays 208 connect the data signals from ports 202 a, b to phy modules, described below, in accordance with tap operation. However, should operation of the POE tap 200 be interrupted due to power loss or other fault, the relays 208 close, and any data signals received from network port A are diverted by relay A to relay B via a signal path 218 and out the network port B via magnetics 4. Likewise, data signals received from network port B during tap interruption are diverted by relay B to relay A via the signal path 218 and out the network port A via magnetics 3. Note that this interconnection necessarily passes the data signals through the magnetics modules 3 and 4, which adds some signal attenuation, but enables the creation of a direct electrical connection between the network ports A and B. This in turn enables the network link to remain up even if the POE tap loses power.

A series of phy modules 210, individually referred to herein as "phy 1," "phy 2," "phy 3," and "phy 4," are each operably connected to the previous described components. In particular, phy 3 and phy 4 of the phys 210 are operably connected to relay A and relay B of the relays 208, respectively, while phy1 and phy 2 are each operably connected to magnetics 1 and magnetics 2 of the magnetics 206, respectively. So configured, each of the phys 1-4 is at least indirectly operably connected to the similarly numbered one of the magnetics 1-4. "Phy" is a contraction for the term "physical layer device." The phys 210 represent integrated circuitry or functional blocks that provide physical access to the data stream. The phys 210 are further configured to receive a data signal and convert it to a particular data format. For instance, in one embodiment phys 3 and 4 receive data signals from the magnetics 3 and 4 in a 1000BASE-T signal format, used with Category 5 copper cabling, and convert the signals to 1000BASE-X serial signals in preparation for later use. Similarly, 1000BASE-X data signals that are received by the phys 1-4 in the reverse direction are converted by the respective phy into 1000BASE-T signals for retransmission onto one of the copper cables 108 and 112. In other embodiments, different data formatting conversions can be performed by the phys 210 as may be needed for a particular application. One exemplary data conversion could be from PAN-5 to SGMII format. Thus, data received by the phys 1-4 are converted as needed for further use by the POE tap 200 or other downline components.

Fanout buffers 212, individually referred to herein as "fanout buffer A" and "fanout buffer B," are provided as to be operably coupled to phy 3 and phy 4, respectively. Each fanout buffer A and B is configured to receive a data signal, such as a 100BASE-X serial signal, from the respective phy and replicate the data signal so as to produce a duplicate copy thereof. The duplicate data signals are then forwarded via transmission lines, as will be explained. Thus in one embodiment, each fanout buffer A and B is configured to receive a differential data signal from phy 3 and phy 4, respectively, and to duplicate the signal. In the case of fanout buffer B, one of duplicated signal streams is forwarded via transmission path 214a, while the other stream is forwarded via transmission path 214b. Likewise, fanout buffer A forwards its duplicated data streams via transmission paths 216a and 216b.

In the case of fanout buffer B, the 1000BASE-X duplicate data stream carried by the transmission path 214a is forwarded to phy 3 where it is converted back to 100BASE-T format before being transmitted through the relay A, magnetics 3, and out of the POE tap 200 via the network A port 202a. In contrast, the 1000BASE-X data stream carried by the transmission path 214b is forwarded to phy 2, where it is converted back to 1000BASE-T format before being transmitted through the magnetics 2 and out of the POE tap 200 via the tap B port 204b.

Fanout buffer A operates similar to that described above with respect to fanout buffer B, wherein the duplicate data streams created by the buffer and carried on the transmission paths 216a and 216b are distributed to phy 4 and phy 1, respectively, to exit the POE tap 200 via network B port 202b, and tap A port 204a. In this way, bidirectional data signals can be received by the POE tap 200 via network ports A and B, conditioned, duplicated, and redirected to the monitoring device via tap ports A and B and cables 112a and b, all while preserving the original intended path of the data signals by enabling the signals to continue their transit on the computer network by exiting the device at one of the network ports A or B. Thus, exact copies of the data signals are sent to two different destinations, thereby enabling the POE tap to divert data to the monitoring device without interrupting the flow of network traffic.

Note that the components discussed above are "operably connected" to one another when data signals are able to pass from one component to the other. These connections are indicated in FIG. 2 by the arrows drawn between the various components.

As mentioned, in accordance with one embodiment, the POE tap 200 is configured to be powered via an electrical supply provided by the power-over-Ethernet ("POE") standard. POE power supplies are provided over selected pairs of wires of a cat-5 or other suitable cable with which the POE tap may be connected. In the embodiment illustrated in FIGS. 1-3, the POE electrical power supply ("POE" supply") can be provided by one or both of the cables 108 a and 108 b to the POE tap 200. Provision of an electrical supply to the POE tap in this manner obviates the need for a more traditional external power supply source, such as use of a standard wall outlet, which is undesirable for the reasons outlined further above.

In greater detail, the POE supply is provided to the POE tap 200 via one or both of the cables 108a, b that are received by and operably connected to the network ports A and B. In one embodiment, the cables are of cat-5 type, each cable having 4 pairs of two wires, equaling 8 wire conductors per cable. In addition to carrying the data signals of the network traffic, the wire pairs can also carry the POE supply according to industry convention. For example, wire pairs 1,2 and 3,6 of each cable can be configured to carry a 48 volt and 0 volt POE supply (at approximately 15-16 watts), respectively, for use by the POE tap. Alternatively, wire pairs 4,5 and 7,8 can be employed to carry the same POE supply. As total power requirements for the POE tap 200 in one embodiment is approximately 6 watts in one embodiment, the POE supply is more than sufficient to enable all tap operations.

Note that the data rate of the data signals carried by the wire pairs of the cables 108a, b is independent of the POE supply, and so the data rate can vary without substantially affecting provision by the cable of the POE supply to the POE tap.

In the present embodiment, the POE supply is transmitted via one or more of the cables 108a, b and network ports A, B to the magnetics 3 and 4. The POE supply, a 48V supply in one embodiment, appears as a difference in DC voltage between one wire pair of the cat-5 cable and another. The DC voltages of each wire pair are accessed at the center taps, i.e., the midpoints of the primary transformer windings, of each magnetics module, and passed to the POE control and regulation circuitry ("regulation circuitry") 222 over POE transmission path 240. The regulation circuitry 222 is configured as a switching power supply that converts the POE supply voltage to other voltages as needed for use by the various components of the POE tap 200, as described above. The regulation circuitry can further be configured to control distribution of the POE supply to the various POE network tap components contained therein The POE supply can be provided by one or both network ports A and B, assuming both ports are configured for supplying the POE electrical supply. If both network ports A and B are so configured, they together form redundant power supply sources such that if a POE supply from one port fails, a POE supply can still be supplied by the other network port. In this case, the regulation circuitry can be configured to regulate POE from one or both ports, and can include additional circuitry to perform switchover from one POE supply to the other as needed.

Further, exemplary embodiments of the invention include a microcontroller 224 that is programmed to monitor and control the operation of the POE tap 200. In general, the microcontroller 224 includes various components, including integrated A/D ("Analog to Digital") converter inputs as well as digitally programmable inputs and outputs ("I/O"), and is programmed as desired to enable achievement of desired functions with respect to the operation of the POE network tap. By way of example, the microcontroller 224 is programmed to configure phys 1-4 to perform the data format translation needed for proper operation of the POE tap 200. Generally, the microcontroller 224 can include internal diagnostic circuitry that enables the POE tap 200 to identify and report faults in the operation of the tap and/or with regard to operation of the computer network 100 with which the POE tap is connected. In some embodiments, the diagnostic circuitry of the microcontroller 224 also provides the capability for the POE tap 200 to resolve identified faults. Some embodiments of the invention include indicators, such as LED visual indicators 245, which operate in connection with the diagnostic circuitry to provide a user with information concerning the operational status and condition of the POE tap.

Exemplarily, the illustrated embodiment of the POE tap 200 includes a relay control 226 that is operably connected to the microcontroller 224. Should it sense that power has been removed from the POE tap, that operating voltages exceed the allowed range, or that some other fault or problem condition exists, the microcontroller 224 can activate the relay control 226 to establish the signal path 218 across the relays A and B so that network traffic can pass through the POE tap unimpeded, thereby preserving the integrity of the data carried in the traffic. The presence of a fault condition can be forwarded to a user interface, such as an LED panel, discussed below, or by other suitable means.

Similarly, FIG. 2 shows that the POE tap 200 includes a temperature sensor 228, operably connected to the microcontroller 224, for monitoring one or more temperature conditions relating to operation of the tap. Should excessive temperature conditions be encountered, the microcontroller 224 can direct corrective measures to be taken so as to prevent damage to the POE tap 200 or interruption of the data stream. The microcontroller 224 can also control operation of any user interface, such as an LED panel, discussed further below.

FIG. 2 further shows the POE tap 200 as including a traditional external power link 230 for plugging into a wall outlet, for instance. Though not required, it may be desirable in some applications for the POE tap to include a redundant power source, such as the external link 230, for backup purpose should the POE functionality fail for some reason. In another embodiment two such redundant external supplies can be provided to the POE tap, if desired.

The POE tap 200 further includes a user interface for allowing the condition and/or operation of the device to be easily ascertained by a technician or user. In the present embodiment, this user interface is implemented as an LED panel 245, containing various LEDs, whose lit status and/or color can indicate various conditions relating to the POE tap device. For instance, in the present embodiment the LED panel 245 includes three LEDs. One LED uses color to indicate the source of the tap's power. For example, a lit green LED indicates that the tap is running on POE power, while a lit orange LED indicates it is running on a backup external supply. The other two LEDs can indicate whether or not a valid link is present on network ports A and B. The LED panel can 245, of course, be configured differently from that described herein.

Figure 4:
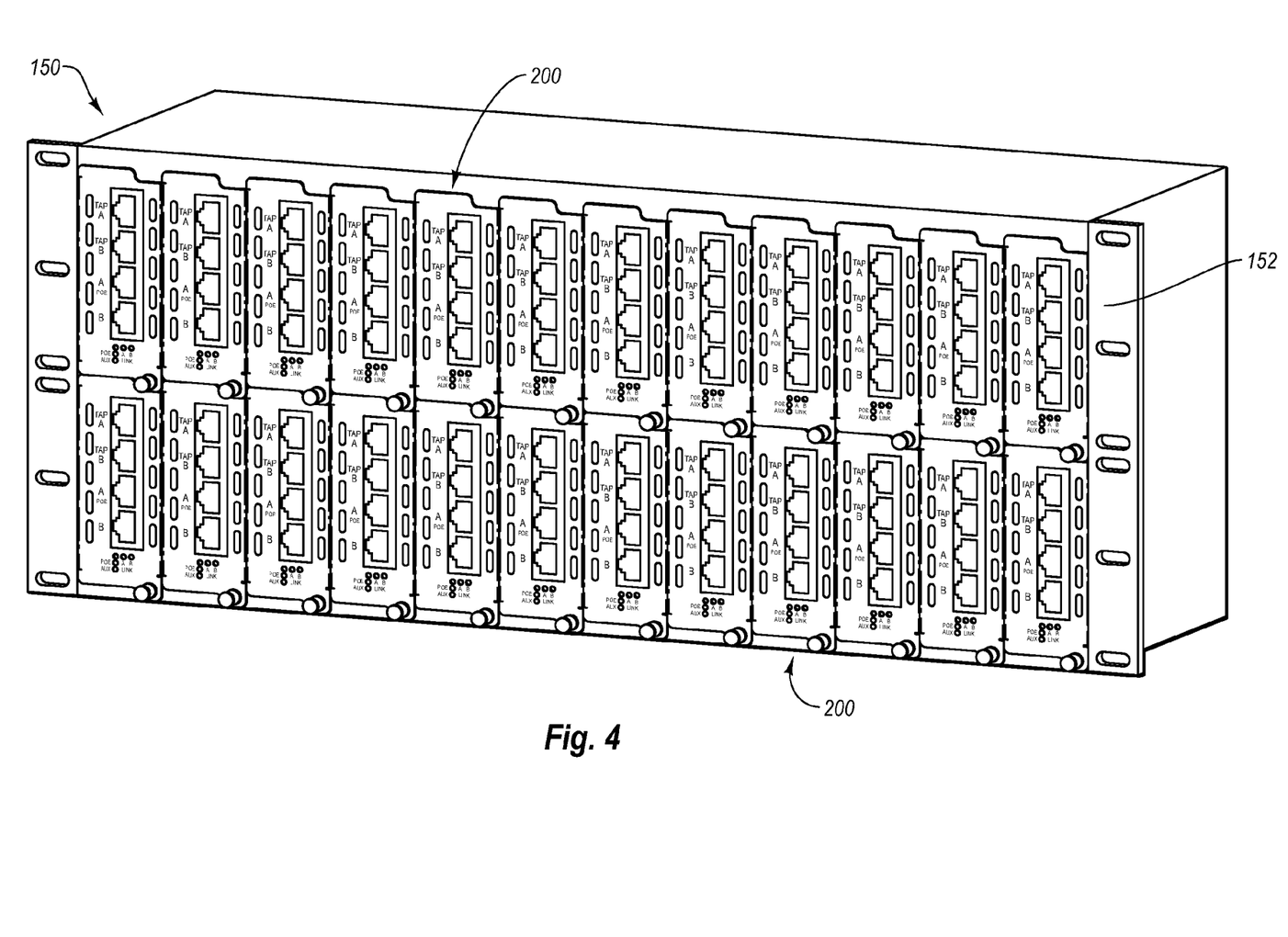
FIG. 4 is a perspective view of a network tap array including a plurality of network taps as shown in FIG. 2.

Together with FIGS. 1-3, reference is now made to FIG. 4. As mentioned, depending upon the needs of the user, the POE tap 200 can be employed alone or, as discussed above in connection with FIG. 1, as part of a larger group of POE tap devices. In the event that multiple POE tap devices are employed, those devices are fitted in the chassis 152, which is suitably sized and configured to retain a predetermined number of devices therein. In the example arrangement shown in FIG. 4, twenty four (24) POE tap devices 200 are retained in the chassis 152 of the POT tap array 150, arranged in two (2) rows of twelve (12) cards each. When thus arranged, the 24 POE tap devices 200 collectively define a chassis form factor having approximate dimensions of about 17" (1 U) wide by about 7" (4 U) high by about 8" deep. So configured, the POE tap array 150 can tap data streams from a variety of points in the computer network 100 and forward these streams to respective monitoring devices for analysis or other treatment.

Figure 5:
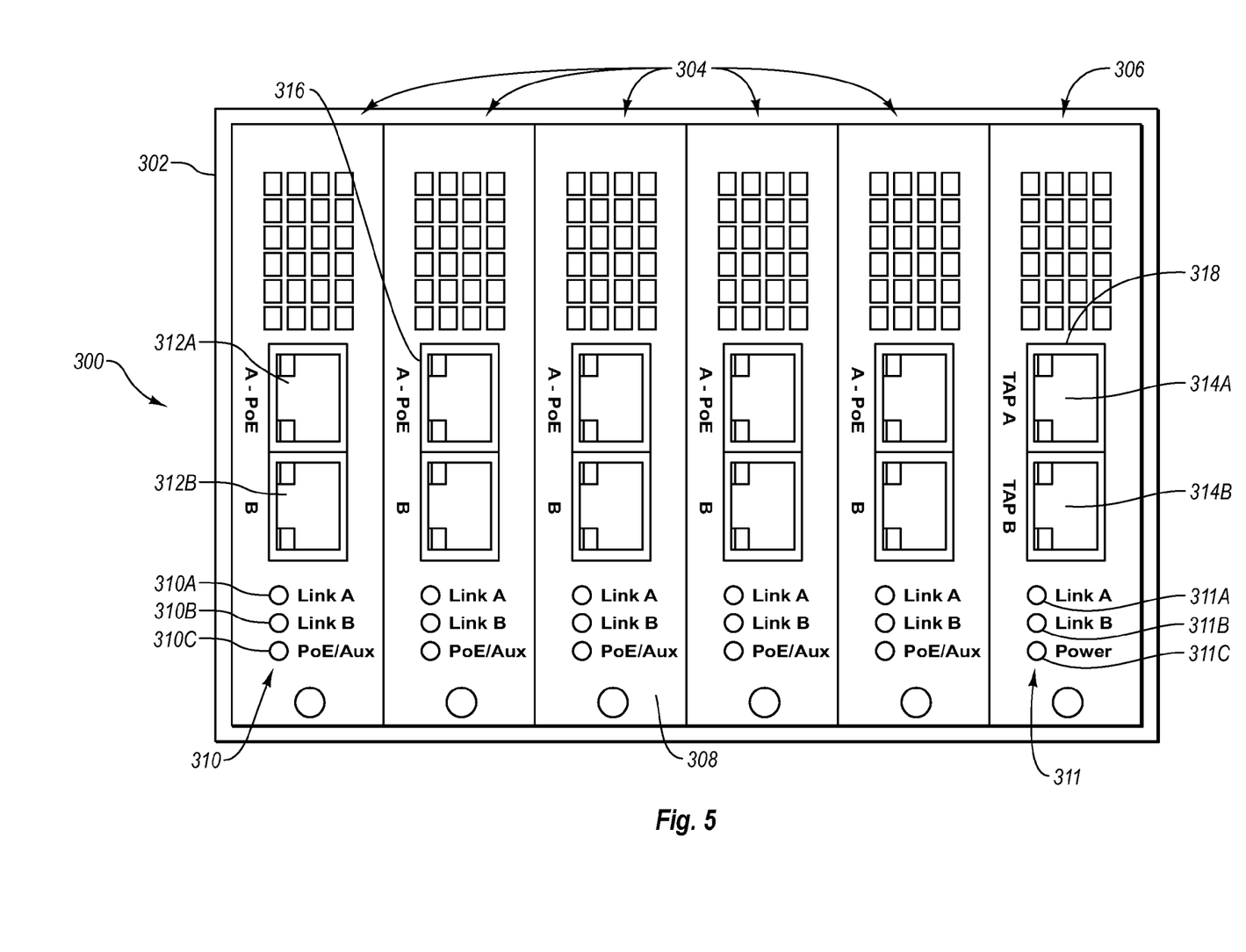
FIG. 5 is a front view of a network tap/aggregator device, according to one embodiment.

Reference is now made to FIG. 5. In another example embodiment of the present invention, the network tapping functions of one or more POE taps can be merged with data aggregating functionality provided by an aggregator to enable both data tapping and aggregating in an integrated device. One example of such a device is shown in FIG. 5, which shows a POE tap/aggregator ("POE T/A"), generally designated at 300. As shown, the POE T/A 300 includes a sub-chassis 302 that houses various components, including a plurality of network tap devices in the form of tap data cards 304, and an aggregator card 306. The POE T/A 300 generally functions by tapping data from various points on the network using the plurality of tap data cards 304, then aggregating that data via the aggregator card 306 before the data is forward to a monitoring device or other suitable component. Use of the POE T/A 300 in this manner simplifies the tapping process and topology by integrating various functionalities into one device.

In a general sense, the POE T/A includes within its sub-chassis a number, "X," of POE active plug-in data cards that operably connect with the corresponding X-into-1 aggregator plug-in card, where "X" again represents the number of cards in the group of POE active data cards. As such, it is appreciated that the number of tap data cards that are to be connected to a corresponding aggregator card can be varied. In the example embodiment illustrated in FIG. 5, five (5) tap data cards are connected with a corresponding 5-into-1 aggregator card. This combination therefore provides both POE aggregation and POE TAP capabilities. In other embodiments, multiple tap data cards could be included with multiple aggregator cards within a single sub-chassis, wherein some of the tap data cards are assigned to one aggregator and the remaining tap data cards are assigned to the other aggregator card.

In the present embodiment, both the tap data cards 304 and the aggregator card 306 have the same form factor. One example form factor for the aforementioned cards is about ⅞ inch wide by 3.5 inches (2 U) high by 5.5 inches deep. Of course, other form factors may be defined and employed as well, and the scope of the invention is not limited to any particular form factor or card configuration.

In greater detail, each of the tap data cards 304 and aggregator card 306 includes a housing including a housing front face 308. An LED bank 310, including LEDs 310a, b, and c, is included on the front face 308 of each tap data card 304 of the POE T/A 300. Similarly, the front face 308 of the aggregator card 306 includes an LED bank 311 including LEDs 311a, b, and c. The LED banks 310 and 311 are employed to enable the functionality status of the tap data cards 304 and aggregator card 306 to be determined, as will be further described below.

Also included on the front faces of 308 of the tap data cards 304 and aggregator card 306 are a plurality of interfaces, or ports, for interfacing with the communications network. In particular, each tap data card 304 includes two RJ-45 network ports 312a and 312b on the front face 308, and a dual output backplane connector (not shown) on the rear portion of the card. In an alternative embodiment the rear portion of the card can include two RJ-45 outlet ports. Correspondingly, the aggregator card 306 includes RJ-45 tap ports 314a and 314b on its front face and a backplane connector (not shown) on the rear portion of the card. Note that this combination of interfaces is merely exemplary, and additional or alternative interfaces may be employed.

The functionality of each tap data card 304 is similar to that of the POE tap 200 described above in connection with FIG. 3. As such, the network ports 312a, b of each tap data card 304 are operably connected to a node on the communications network by communication cables such that data traversing the network at the node can be input into and output from the tap data card via the network ports. Each tap data card 304 can be interconnected with a different node on the network so as to enable data from various points on the network to be tapped.

The backplane connector on the rear portion of each tap data card 304 is operably connected to the backplane connector of the aggregator card 306 so as to enable each data stream from each outlet port to be input into the aggregator card. Thus, in the POE T/A configuration shown in FIG. 5, the aggregator card 306 is configured to receive data streams from the outlet ports of each of the tap data cards 304 via its backplane connector.

Once received by the aggregator card 306, the data streams received from each tap data card outlet port are combined, or aggregated, into two composite data streams that are directed out of the aggregator card 306 via the tap ports 314a, b. These data streams can then be forwarded via communication cables to a monitoring device or other suitable location.

In the present embodiment, each of the tap data cards 304 is powered by a power-over-Ethernet ("POE") supply provided via at least one of the communication cables that operably couple with the network ports 312a, b in a manner similar to that described above in connection with the POE tap 200 of FIG. 3. In addition, the POE power supply can be forwarded to the aggregator card 306 via the interconnection between the outlet ports at the rear portion of at least one of the tap data cards 304 and the backframe connector of the aggregator card. In this way, some or all of the components of the POE T/A 300 can be fully powered by a POE supply provided via network communication cables. Also, the tap data cards 304, the aggregator card 306, or both can include DC power connectors to enable them to be selectively powered via a DC power supply provided in the traditional manner, if desired. In another embodiment, only the tap data cards are POE-powered, while the aggregator card 306 is DC-powered.

In the illustrated embodiment, the aforementioned tap data cards 304 receive the POE supply from the network port A (312a), though the scope of the invention is not limited to this example implementation. In example embodiments, the tap data cards 204 are POE and aggregator card 306 are configured for use with Type 3 POE (15 W).

In one embodiment where both the tap data cards 304 and the aggregator card 306 are dual sourced components, i.e., components operable by both POE and DC power, functionality is included to enable switching between POE and DC power sources when needed, such as when a data link over one of the communication cables is interrupted, thereby interrupting the flow of the POE supply. Further, the tap data card 304 and the aggregator card 306, and even the POE tap 200 (FIG. 3) discussed further above, are configured to continue to pass data without error when switching between POE and DC power sources is performed.

Embodiments of the invention also implement mechanisms for responding to a loss of both the POE and DC power sources. For example, the POE tap 200 (FIG. 3) and the tap data card 304 can switch from normal buffered tapping operation to a pass-through operation mode upon loss of both POE and DC power. In one embodiment, this switchover occurs in about 8 ms or less. In pass-through mode, the particular tap device does not pass data to the tap ports or aggregator card, respectively, but rather allows the data to continue its path from the transmitting device to the intended receiving device in the network. Upon restoration of either POE or DC power, the tap device can switch from pass-through operation mode to buffered tapping operation, again in about 8 ms or less in one embodiment. When buffered operation has recommenced, data passage to the tap ports or aggregator card, respectively, is resumed.

In embodiments where the aggregator card 306 of the POE T/A 300 loses all sources of POE, DC power, or both, the aggregator card as well can be configured with a response mechanism that is triggered such that the aggregator card causes the card to cease aggregation and data passing to the monitoring device. Upon restoration of power, aggregation and data passing recommence.

It should be noted that the foregoing mechanisms are examples only, and the scope of the invention is not so limited. More generally, any type and number of parameters concerning response of the card to power loss can be specified and implemented. Thus, parameters such as the response time can be varied as desired. As another example, and as discussed elsewhere herein, status signals can be provided by the card to a user indicating the status of the card as powered or unpowered, and/or indicating the power source, if any, currently being utilized by the car, as will be discussed below.

As suggested earlier herein, embodiments of the invention incorporate indication functionality that enables a user to make various determinations concerning the operation and status of a card or cards. Details concerning some example indicators and indication schemes for the POE T/A 300 are provided below in connection with FIG. 5. More generally however, the particular number and type of indicators, and the manner in which those indicators are employed can be varied as desired. Note that an exemplary indication scheme for the POE tap 200 was given above.

As indicated in FIG. 5, each of the tap data cards 304 of the POE T/A 300 includes the LED bank 310, including the LEDS 310a, b, and c. Each of the LEDs 310a, b, and c can act as a status indicator, such as a bi-color LED for example, in order to supply a visual status indication with regard to the power supply and link connectivity for those cards. In one example implementation, the LED 310c of each tap data card 304 is a bi-color LED that lights green if POE is detected on network port A, which is the designated port for providing a POE supply to the tap data card. The LED 310c will indicate yellow if POE is not detected on network port A but DC power is being supplied to the card. The LED 310c remains unlit if the following are both true: POE is not detected on network port A, and DC power is not present. Such an indication scheme enables a user to rapidly and reliably make a visual determination as to the status of the power supply to a particular card and thus contributes to assessment and troubleshooting efforts.

The LEDs 310a, b can be used to indicate the link status of each of the tap data cards 304. In one embodiment, the LED 310a will light green if a valid Gigabit Ethernet connection is detected on network port A, while the LED 310b will light green if a valid Gigabit Ethernet connection is detected on network port B. In addition, the front face 308 of each tap data card 304 includes identifications for each of the network ports 312a and 312b. For instance, in the present embodiment the network port 312a of each tap data card 304 is configured to receive a communication cable that carries the POE supply to the card. As such, this port is labeled "A-PoE" to indicate this relationship. Network port 312b is correspondingly labeled "B."

Note that the labeling present on the front face 308 of the tap data cards 304 as described above can be modified according to the different configurations possible with the tap data cards or the aggregator card.

Similar to the tap data card 304, the aggregator card 306 also includes indication functionality that enables a user to make various determinations concerning the operation and status of the card. As mentioned, the example embodiment disclosed in FIG. 6 includes an aggregator card having the LED bank 311 including the LEDs 311a, b, and c. The LED 311c lights green when DC power is detected on the DC power port, and lights red or is extinguished, when no DC power is detected on the DC power port. Similar to the tap data cards 304, the LEDs 311a, b of the aggregator card 306 can be used to indicate the link status of the aggregator ports: in one embodiment, the LED 310a will light green if a valid Gigabit Ethernet connection is detected on network port A, while the LED 310b will light green if a valid Gigabit Ethernet connection is detected on network port B.

Further indications can be included on the front faces 308 of these devices. As illustrated, for instance, a halo 316 of a particular color can be defined about the network port A of each tap data card 304 to indicate the port's assignment for receipt of the POE supply. Likewise, a colored halo 318 can be placed around the tap ports of the aggregator card 306 to indicate their respective functions for outputting tapped data signals to a monitoring device.

Figure 6:
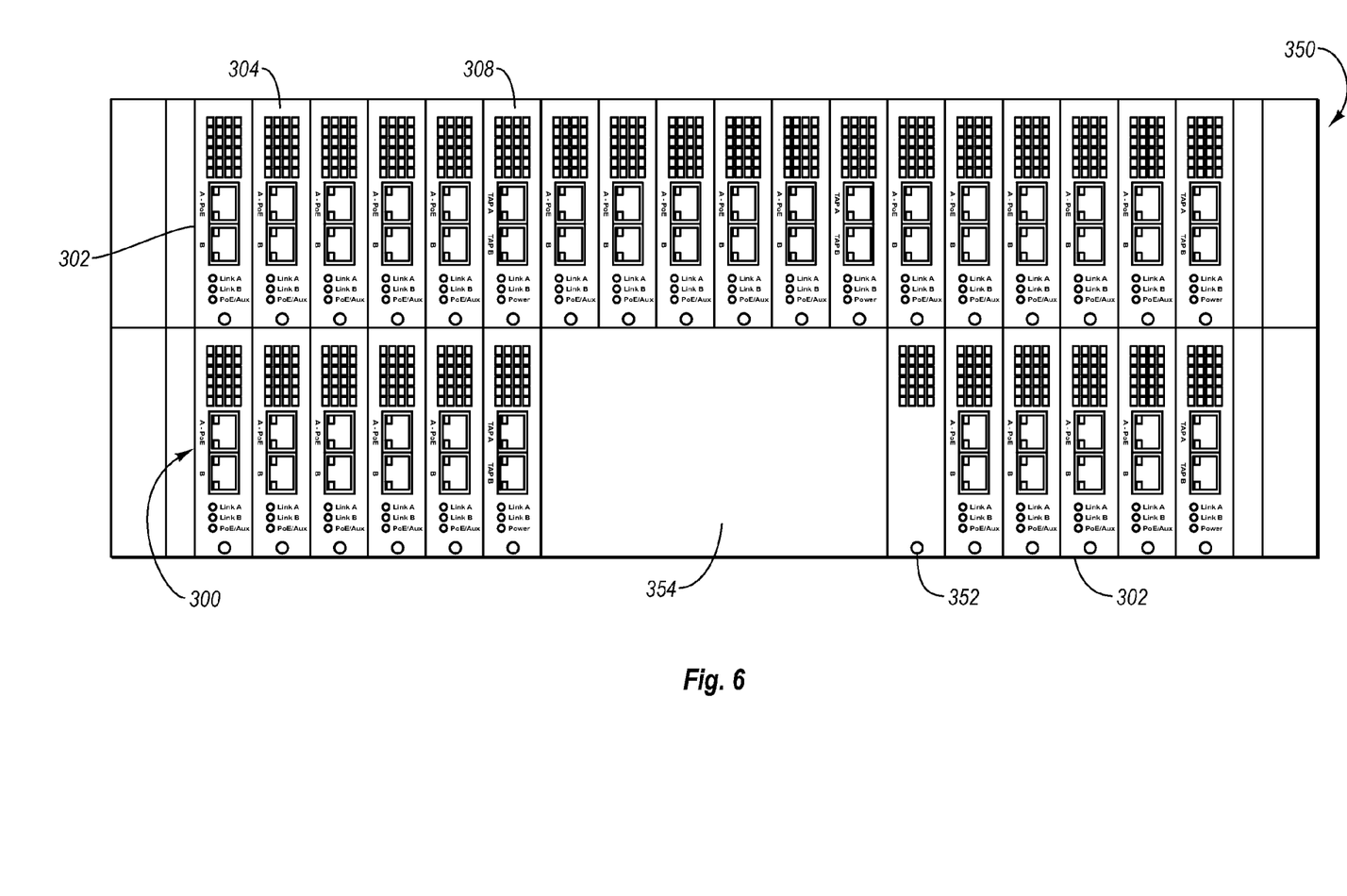
FIG. 6 is a front view of a network tap/aggregator array housed in a chassis, in accordance with one embodiment.

Together with FIG. 5, reference is now made to FIG. 6. As previously mentioned, the components of the POE T/A 300 are included in a housing referred to herein as the sub-chassis 302. In general, the form factor of a particular sub-chassis will depend upon the number of cards that are included in the sub-chassis. As an example, the 5-into-1 tap/aggregator arrangement disclosed in FIG. 6 has a form factor of less than about 7" high by about 5⅔" wide by about 12" deep.

As suggested above, however, multiple sub-chassis can be combined together in an equipment rack to form or define a chassis, such as the chassis shown in FIG. 6 and generally designated at 350. In the present example embodiment, five sub-chassis 302, each including five tap data cards 304 and one aggregator card 306, are combined together in an equipment rack to form the chassis 350 that can provide POE data tapping and aggregation for thirty (30) data links. The form factor for the example arrangement of the chassis 350 in FIG. 6 is about 7" high by about 19" wide by about 12" deep. This arrangement generally corresponds with a standard 4 U rack mount.

In the example arrangement illustrated in FIG. 6, one of the sub-chassis 302 includes an unutilized link 352, while the chassis 350 itself includes a vacant sub-chassis location 354. These details illustrate that fewer than all of the links in any given sub-chassis, and fewer than all sub-chassis locations may be employed in a particular configuration. Because some or all of the links of any number of sub-chassis can be employed, embodiments of the invention enable virtually unlimited flexibility in terms of the definition and implementation of POE tap/aggregation arrangements. Moreover, because data signal transfer between the pluggable cards of the chassis occurs in the chassis backplane, the need to use cables and other connectors in one embodiment is greatly reduced.

II. General Functional Characteristics

Embodiments of the present invention disclosed herein may be constructed and employed for conformance with a wide variety of functional parameters and in a variety of environmental conditions. The following discussion is directed to functional parameters with which at least some embodiments conform. It should be noted that the following functional parameters, and their particular values, are examples only and are not intended to limit the scope of the invention in any way. More generally, the functional parameter(s), and their associated values, with which particular software, system(s) and/or device(s) conform may be selected and implemented as desired.

Embodiments of the present invention, including those described above, are configured for conformance with a variety of standards for one or more countries. By way of example, at least some embodiments of the invention conform to industrial electrical standards for operation in the European Union ("EU"). Such standards include, but are not limited to, WEEE, UL, TuV and CE. Exemplary embodiments also conform with European RoHS requirements.

Exemplary embodiments of the present invention disclosed herein provide acceptable performance over a range of environmental conditions. Conditions that such embodiments are able to withstand include: operating temperatures in a range of about 0° C. to about 40° C. (32° F. to 104° F.); storage temperatures in a range between about −40° C. to about 75° C. (−40° F. to 167° F.); relative humidity in a range of about 10 to about 90 percent (non-condensing); and, operating altitudes in a range of about −60 m to about 3000 m (−197 feet to 9843 feet). Of course, embodiments of the invention may be constructed for conformance with additional or alternative environmental conditions.

Embodiments of present invention disclosed herein may be configured for use with one or several different line rates, or operational speeds. For example, at least some embodiments are operable at 10 Mb/s, 100 Mb/s and Gigabit Ethernet speeds. In addition, at least some examples of the 1×1 POE tap, tap data card, and aggregator card all support auto-negotiation. These example cards are also configured so that if auto-negotiation is not present, the cards will default to a 1 Gbit/s data rate. Of course, other default rates may be alternatively employed.

Embodiments of the present invention disclosed herein implement a high level of flexibility in terms of the hardware and software with which they may be employed. By way of example, all of the tap systems, devices and software disclosed herein are interoperable with devices that operate on Gigabit Ethernet signals. Such devices include, but are not limited to, Finisar Corp. NetWisdom and Xgig products. More generally however, embodiments disclosed herein can be configured for interoperability with any other desired systems, devices and software. Accordingly, the scope of the invention is not limited to the foregoing examples.

In addition, embodiments of the POE tap, tap data card, and aggregator card are configured to interoperate within the same sub-chassis. In one example arrangement, the tap data card will pass data signals to the 5-into-1 aggregator card for purposes of aggregation. As noted earlier herein, a group of the tap data cards can be combined with an X-into-1 aggregator card in a sub-chassis. The X-into-1 aggregator card may reside in a keyed aggregator card slot.

Embodiments of the present invention disclosed herein may be configured to operate at or below a specified bit error rate ("BER.") In at least some embodiments, the disclosed software, systems and devices substantially conform with a BER requirement of about 1×10E-16 between A/B ports, between A/tapA ports, and between B/tap B ports. Of course, different BERs, and/or performance metrics may all reside in a keyed aggregator card slot.

In exemplary embodiments, the TAP devices substantially conform with an uptime requirement of about 99.999%.

Some embodiments of the tap data card 304 are configured to retime signals passing between its network A and network B ports. Additionally, embodiments of the tap data card 304 are configured to retime signals passing between its network A/tap A ports and the network B/tap B ports of that card.

In addition to implementing data stream operations such as retiming, at least some of the embodiments of the systems and devices disclosed herein implement buffering functionality. For example, at least some embodiments of the POE tap 200, are configured to buffer signals passing between the network A/B ports, network A/tap A ports and network B/tap B ports of that card. In this example, such buffering induces a latency not more than about 1 ms between the network A/B ports. Additionally, the buffering in this example does not induce a latency greater than about 1 µs between the network A/tap A ports or between the network B/tap B ports.

At least some embodiments of the tap data card 304 and the X-into-1 aggregator card 306 implement buffering functionality as well. For example, the tap data card will buffer signals passing between the A and B ports of that card. When buffering, the tap data card will not induce a latency of more than about 1 ms between the network A/B ports. Additionally, embodiments of the tap data card and the X-into-1 aggregator card will buffer signals between the network A/tap A ports and network B/tap B ports. These cards, alone or in combination, will not induce a latency of more than about 1 ms between the network A/tap A ports or between the network B/tap B ports.

At least some of the embodiments of the present invention disclosed herein are also configured to implement signal regeneration functionality. For example, at least some embodiments of the POE tap 200 are configured to regenerate signals passing between the network A/B ports, the network A/tap A ports, and the network B/tap B ports. As another example, the tap data card is also configured to regenerate signals passing between the network A/B ports, the network A/tap A ports, and the network B/tap B ports. In similar fashion, at least some embodiments of the aggregator card, such as the 5-into-1 TAP aggregator card 306, are configured to regenerate signals passing between the network A/B ports, the network A/tap A ports, and the network B/tap B ports.

At least some of the embodiments of the present invention disclosed herein are compatible for use with data streams that include, among other things, data frames sometimes referred to as 'jumbo' Gigabit Ethernet data frames. Further, in some embodiments, the POE tap card 200 and tap data card 304 are configured so that when passing POS frames between network data ports, the cards are capable of increasing or decreasing pause frame counts arbitrarily within ranges specified by the Gigabit Ethernet specification. Additionally, the POE tap is configured so that when passing POS frames between network data ports and tap ports, the cards are capable of increasing or decreasing POS frame counts arbitrarily within ranges specified by the Gigabit Ethernet specification.

Finally, the X-into-1 aggregator card 306 implements similar functionality. In particular, at least some embodiments of the X-into-1 aggregator are configured so that when passing data received from tap data cards to the aggregator card tap port(s), the aggregator is capable of increasing or decreasing POS frame counts arbitrarily within ranges specified by the Gigabit Ethernet specification.

At least some of the embodiments of the software, systems and devices disclosed herein, such as the POE tap and the tap data card for example, are configured so that when either side of the tap port drops the link, the other tap port will drop the link as well. Correspondingly, when the dropped link is reestablished at the tap port where the link was initially dropped, the link of the other tap port of the card will be reestablished as well.

At least some of the device embodiments disclosed herein are configured to be hot swapped, that is, inserted into and removed from a rack while the chassis or sub-chassis is powered. Additionally, hot swappable cards are configured to begin operation within about 1 second after insertion.

Embodiments of the aggregator 306 are configured to auto detect the number of tap data cards 304 installed in the sub-chassis 302 with which the aggregator is associated (FIG. 6), and to perform aggregation based upon the number of cards detected. In some embodiments, the aggregator card 306 starts aggregating data from a newly detected card within about 1 second after the card has been inserted. As well, the aggregator card 306 will cease aggregating data from a removed card when all of the data from the removed card is gone from the buffers of the aggregator card.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A power-over-Ethernet powered network tap device array, comprising:
   a chassis; and
   a plurality of network tap devices included in the chassis, each network tap device comprising a network port and a tap port, the network port configured to operably connect with a communication cable carrying a power-over-Ethernet supply,
   at least one of the network tap devices being powered by the power-over-Ethernet supply, and
   at least one of the network taps configured to forward a portion of the power-over-Ethernet supply through the tap port to power any monitoring device connected to the tap port via a communication cable.

2. The network tap device array as defined in claim 1, wherein each network tap device further includes a second network port configured to operably connect with a communication cable, the communication cable configured to carry data signals to and from the respective network tap device, the communication cable further configured to carry a power-over-Ethernet supply.

3. The network tap device array as defined in claim 2, wherein the first and second network ports are RJ-45 ports located on a front face of each network tap device.

4. The network tap device as defined in claim 1, wherein each of at least some of the network tap devices is exclusively and operably connected to a respective monitoring device.

5. The network tap device array as defined in claim 1, wherein the network tap devices are included in a plurality of sub-chassis that are each included in the chassis.

6. The network tap device as defined in claim 5, wherein each sub-chassis of the chassis includes a plurality of network tap devices and an aggregator device, the aggregator device being operably connected to each of the network tap devices included in the sub-chassis.

7. The network tap device as defined in claim 6, wherein each network tap device is powered by the power-over-Ethernet supply, and wherein the aggregator device is also powered by the power-over-Ethernet supply.

8. A network tap device array for monitoring data transmitted via a communications network, the array comprising:
  a chassis; and
  a plurality of network tap devices positioned in the chassis, each network tap device including:
    first and second network ports configured to operably connect with communication cables, the communication cables configured to carry data signals to and from the network tap device, the communication cables further configured to carry a power-over-Ethernet supply;
    first and second tap ports configured to operably connect with communication cables, the communication cables configured to carry data signals and at least a portion of the power-over-Ethernet supply to at least one connected device; and
    control and regulation circuitry that is configured to receive the power-over-Ethernet supply from at least one of the communication cables via the respective one of the first and second network ports, wherein the control and regulation circuitry is configured to forward the at least a portion of the power-over-Ethernet supply through at least one of the tap ports to the at least one connected device.

9. The network tap device array as defined in claim 8, wherein each network tap device is configured according to a blade design, and wherein each network tap devices includes a front face.

10. The network tap device array as defined in claim 9, wherein the first and second network ports and the first and second tap ports are included on the front face of each network tap device.

11. The network tap device array as defined in claim 10, wherein each of at least some of the network tap devices includes an LED panel for communicating details regarding the operating condition of the respective network tap device.

12. The network tap device as defined in claim 11, wherein the LED panel includes an LED that is lit when a power-over-Ethernet supply is present on one of the communication cables that are operably connected to one of the first and second network ports, and wherein the LED panel includes at least one LED that is lit when a link is established between the communications network and one of the first and second network ports.

13. The network tap device array as defined in claim 12, wherein each of at least some of the network tap devices is approximately 3.5 inches wide by about 1.4 inches high by about 5.5 inches deep.

14. The network tap device array as defined in claim 13, wherein each of at least some of the network tap devices is configured to acceptably operate within a temperature range from approximately zero to 40 degrees Celsius and within an altitude range from approximately −60 meters to about 3000 meters.

15. The network tap device array as defined in claim 14, wherein each of at least some of the network tap devices is configured to operate with a range of data rates from approximately 10 Mb per second to at least 1 Gbit per second.

16. The network tap device array as defined in claim 15, wherein the chassis is configured to accommodate 24 network tap devices in a 12-by-2 arrangement.

17. The network tap device array as defined in claim 15, wherein each of at least some of the network tap devices is configured to be hot swapped into and out of the chassis.

18. A network tap/aggregator device array included in a communications network, comprising:
  a sub-chassis;
  a plurality of network tap devices included in the sub-chassis, each network tap device being powered by a power-over-Ethernet supply, each network tap device capable of outputting a stream of data relating to data transmitted via the communications network; and
  at least one aggregator that receives and aggregates the streams of data output from each of the network tap devices, the at least one aggregator configured to forward the aggregated data to a monitoring device, wherein the at least one aggregator is capable of being powered by the power-over-Ethernet supply received from one or more of the network tap devices.

19. The network tap/aggregator device array as defined in claim 18, wherein each aggregator is further capable of being powered by a DC power supply.

20. The network tap/aggregator device array as defined in claim 19, wherein the sub-chassis is capable of receiving five network tap devices and one aggregator therein.

21. The network tap/aggregator device array as defined in claim 20, wherein multiple sub-chassis are received into a chassis.

22. The network tap/aggregator device array as defined in claim 21, wherein each network tap device includes two network ports on a front face thereof, and wherein the aggregator includes two tap ports on a front face thereof.

23. The network tap/aggregator device as defined in claim 22, wherein each network tap device is operably connected to the aggregator within the sub-chassis via a backplane connector, and wherein the power-over-Ethernet supply is received by the aggregator via the backplane connector.

24. The network tap/aggregator device array as defined in claim 23, wherein each network tap device is capable of data buffering, and wherein the aggregator is capable of auto-detection of sub-chassis devices.

25. The network tap/aggregator device array as defined in claim 24, wherein each of the network tap devices is capable of being powered by a DC power supply.

* * * * *